United States Patent Office 2,751,035
Patented June 19, 1956

2,751,035

BREATHING APPARATUSES

Armand Jacques Julien Poelman, Paris, France, assignor to Etablissements R. Schneider, Paris, France Application December 11, 1951, Serial No. 261,091

Claims priority, application France December 14, 1950

1 Claim. (Cl. 183—4.8)

This invention relates to breathing apparatuses and more particularly to improvements in breathing apparatuses for permitting one to stay in atmospheres laden with gases, vapours, dusts or noxious particles.

The invention is still more particularly concerned with apparatuses of the type comprising two conventional purifying containers or cartridges in which the inhaled air passes through a filter and a bulk of a granulated adsorbent substance, said cartridges being connected in parallel with a respiratory mask.

In spite of all the care used to effect a uniform ramming of the masses of granulated adsorbent substance (such as activated charcoal) passages of less resistance to the flow of air are formed therein and the latter tends to follow these passages. As a result, after some time the air having passed through the bulk of granulated adsorbent mass will contain traces of noxious substances while the adsorbent as a whole is far from being saturated therewith.

Besides, when two or more purifying containers or cartridges are mounted in parallel these cannot be expected to be practically identical with each other. As a rule, one of them will always allow more air or easier passage of air therethrough. Thus, this one container will permit the passage of traces of noxious substances in the air passed therethrough while the other or others will still deliver pure or filtered air. To sum up, it may be said that the useful life of the apparatus will subsequently be conditioned by the useful life of the purifying container through which air flows more readily.

Moreover, it may happen that the air to be purified contains an unforeseen noxious substance which the usual adsorbent is unable to retain. In this case the apparatus becomes inoperative as a protective device.

It is therefore one object of this invention to ensure a better utilization of the adsorbent substance by permitting the whole mass thereof to become saturated or approximately saturated with noxious substances.

It is another object of this invention to enable the apparatus to retain a noxious agent not adsorbed by the usual adsorbent substance therein.

It is a further object of this invention to make it possible with conventional purifying cartridges to manufacture compact breathing apparatus of relatively reduced overall dimensions and adapted to the various cases likely to arise in the practice.

These and other objects of the invention will become apparent to those skilled in the art as the following description of a preferred embodiment thereof proceeds, this embodiment comprising notably a complementary mass of air cleaning substance separate and spaced from that contained in the purifying cartridge or cartridges.

According to the invention, the connecting means between the purifying containers or cartridges and the respirator comprises a case for a complementary mass of a granulated adsorbing agent analogous with the one contained in the said purifying containers or cartridges. It may also be selected in view of retaining one or a plurality of noxious agents to which the usual adsorbent substance is not responsive.

The air having passed through the purifying cartridge or cartridges along the less resistive passages of their adsorbent agent so as to still contain traces of noxious substances will thus subsequently follow a relatively free path and then contact the complementary air-cleaning mass. The less resistive paths are therefore interrupted and the traces of noxious substances eliminated by the aforesaid complementary mass.

Experience shows that the useful life of the assembly is augmented to a much greater extent than if the thickness of the adsorbent mass in the purifying cartridges had been increased by an amount equal to the thickness of a separate and spaced complementary mass of the same adsorbent.

The case may also be provided with an aperture fitted with a detachable plug for either introducing the required air-cleaning agent therein or filling the case with fresh air-cleaning agent after the saturated one has been removed therefrom.

The accompanying drawings illustrate diagrammatically by way of example one embodiment of the device according to this invention. In the drawings.

Figure 1:
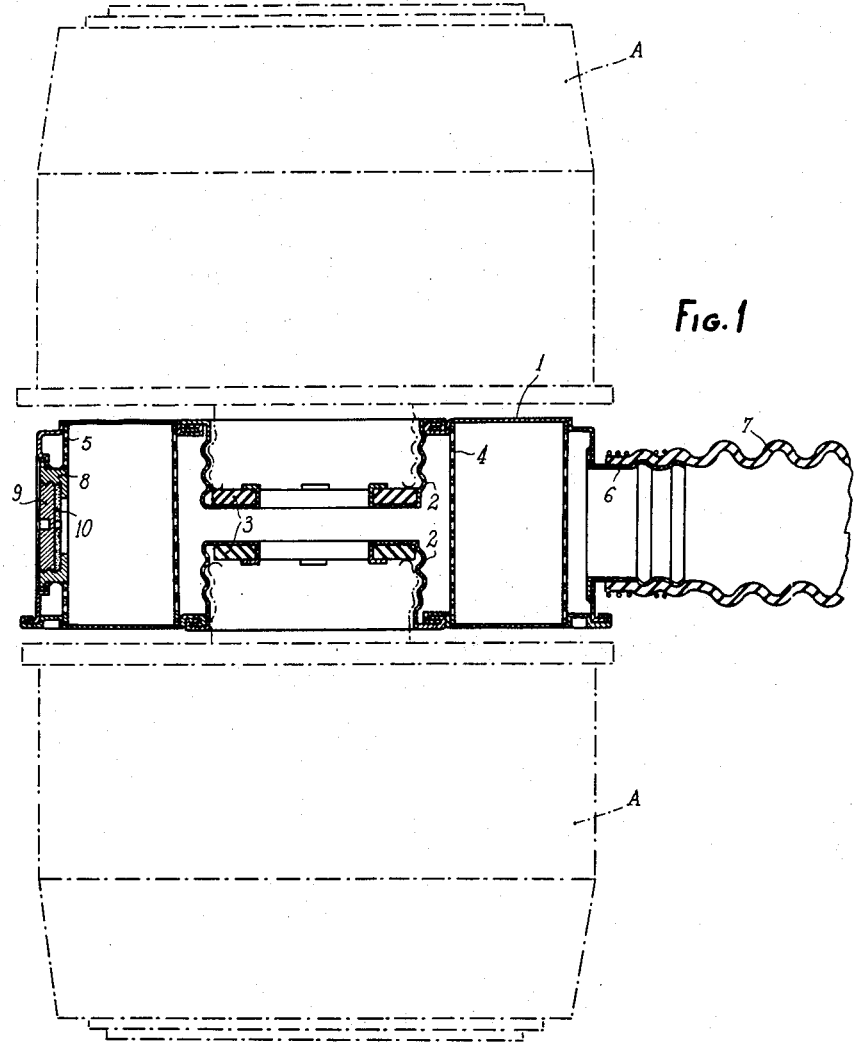
Fig. 1 is an axial section.

Referring first to Fig. 1 the device comprises what may be termed an auxiliary casing consisting of a cylindrical case 1 having formed in its end walls two inwardly-extending, internally-threaded cylindrical neck members 2, 2 formed in turn at their inner ends with annular flanges each adapted to receive and retain a gasket 3, 3 as shown. This neck member assembly together with the casing defines an annular chamber within which is a pair of concentric perforated walls 4, 5 extending from end wall to end wall of the device. In the bottom of the neck members 2, 2 are apertures giving access to the space within the casing between the neck pieces, which space opens into said annular chamber.

The case 1 is also formed with a lateral radial neck member 6 projecting outwards and adapted to receive as shown a ringed hose 7 of rubber or equivalent material connected to the mask or respirator.

At another location the cylindrical wall of the case 1 is formed with an aperture having fixed thereto a ring member 8 connecting directly the outside atmosphere with the annular chamber formed between the walls 4, 5 through a suitable hole provided in the outer wall 5. The ring member 8 is internally threaded and a correspondingly threaded plug 9 is fitted therein. The ring member 8 is formed with a seat in which a gasket 10 is pressed by the plug 9 in an air-tight manner.

Upon removal of the plug 9 any desired air-cleaning agent may be introduced into the annular space formed between the walls 4, 5 and the end walls 1 of the case.

Figure 2:
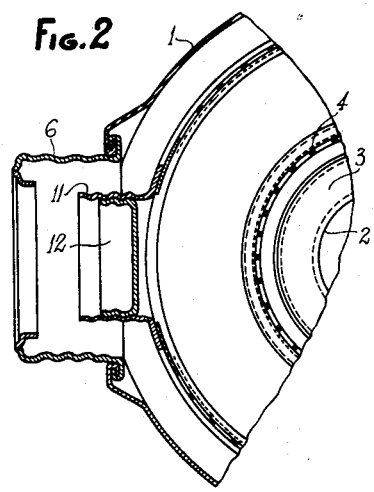
Fig. 2 is a detail view in fragmentary cross-section of a modified embodiment of the device.

In the modified embodiment illustrated in Fig. 2 the outer perforated wall 5 is formed with a neck member 11 coaxial with the neck member 6 and provided with a screw plug 12.

Both axial neck members 2, 2 of the case 1 are adapted to be engaged by the screw tubular portions of a pair of purifying catridges A, A of the filter and adsorbent type already known per se (see French Patent No. 845,722 filed April 5, 1938).

Air drawn through cartridges A, A passes through the apertures in neck pieces 2, 2 and radially outwardly through the space between them into the annular chamber. As the air is being drawn axially of the neck pieces, it must make an abrupt change of direction to flow radially outwardly. In flowing from the relatively confined space between the neck members 2, 2 into the annular chamber, the air undergoes an expansion. The combination of the abrupt directional change and the expansion serves to promote purifying efficiency.

The case 1 may be fitted with a single cartridge instead of two as shown, the free neck member 2 being closed by a screw plug in this case.

Of course, the invention is not limited to the precise embodiment described and illustrated herein, as many modifications may be brought thereto without departing from the spirit and scope of the invention.

What I claim is:

In a respiratory apparatus having a pair of purifying cartridges each containing a granulated adsorbing mass and each having a threaded tubular member projecting therefrom, and a hose adapted to be connected to a mask or respirator, that improvement comprising an auxiliary casing between said cartridges comprising a cylindrical case with end walls, an inwardly extending internally threaded neck in each end wall opening into said casing and into which the tubular members are threaded, said necks and the cylindrical wall of said casing defining between them an annular chamber, a pair of concentric perforated walls within said annular chamber spaced from the wall of said casing and the necks and from each other, granulated adsorbing material contained in said space between said walls and a ring member having a plug therein between the wall of said casing, and the concentric perforated wall spaced therefrom.

References Cited in the file of this patent

UNITED STATES PATENTS

| | | |
|---|---|---|
| 533,854 | Loeb | Feb. 5, 1895 |
| 1,585,113 | Robert | May 18, 1926 |
| 1,963,874 | Stampe | June 19, 1934 |
| 2,086,739 | Reed | July 13, 1937 |
| 2,174,528 | Prentiss | Oct. 3, 1939 |
| 2,634,821 | Chipley | Apr. 14, 1953 |

FOREIGN PATENTS

| | | |
|---|---|---|
| 65,635 | Denmark | Sept. 1, 1947 |
| 511,055 | Great Britain | Aug. 11, 1939 |
| 511,986 | Great Britain | Aug. 28, 1939 |
| 523,240 | Great Britain | July 9, 1940 |
| 902,259 | France | Aug. 23, 1945 |